United States Patent [19]
Ishida et al.

[11] Patent Number: 5,705,891
[45] Date of Patent: Jan. 6, 1998

[54] POWER SUPPLY FOR REDUCING THE POWER CONSUMPTION OF DIGITAL OSCILLOSCOPE

[75] Inventors: Hirohisa Ishida, Tokorozawa; Toshihide Okada, Kodaira, both of Japan

[73] Assignee: Hitachi Denshi Kabushiki Kaisha, Tokyo, Japan

[21] Appl. No.: 313,841

[22] Filed: Sep. 28, 1994

[30] Foreign Application Priority Data

Sep. 30, 1993 [JP] Japan .................................. 5-267942
Sep. 30, 1993 [JP] Japan .................................. 5-267943

[51] Int. Cl.$^6$ .................................................. H01J 23/34
[52] U.S. Cl. ........................ 315/1; 315/383; 364/487; 364/769; 340/723
[58] Field of Search ............................ 364/487, 769; 315/383; 340/723

[56] References Cited

U.S. PATENT DOCUMENTS 4,808,989  2/1989  Tabata .

*Primary Examiner*—Frank G. Font
*Assistant Examiner*—Reginald A. Ratliff
*Attorney, Agent, or Firm*—Antonelli, Terry, Stout, & Kraus, LLP

[57] ABSTRACT

In a digital oscilloscope for indicating an input signal waveform on a display, all or part of the circuits which constitute the oscilloscope are de-energized in accordance with at least one of an operation mode in which the digital oscilloscope has been set by the user and another mode of the oscilloscope. Alternatively, it is determined whether the digital oscilloscope is not operated for a time established by the user or more, and if it is determined that the oscilloscope is not operated for the set time or above, the display is de-energized.

21 Claims, 8 Drawing Sheets

F I G. 5
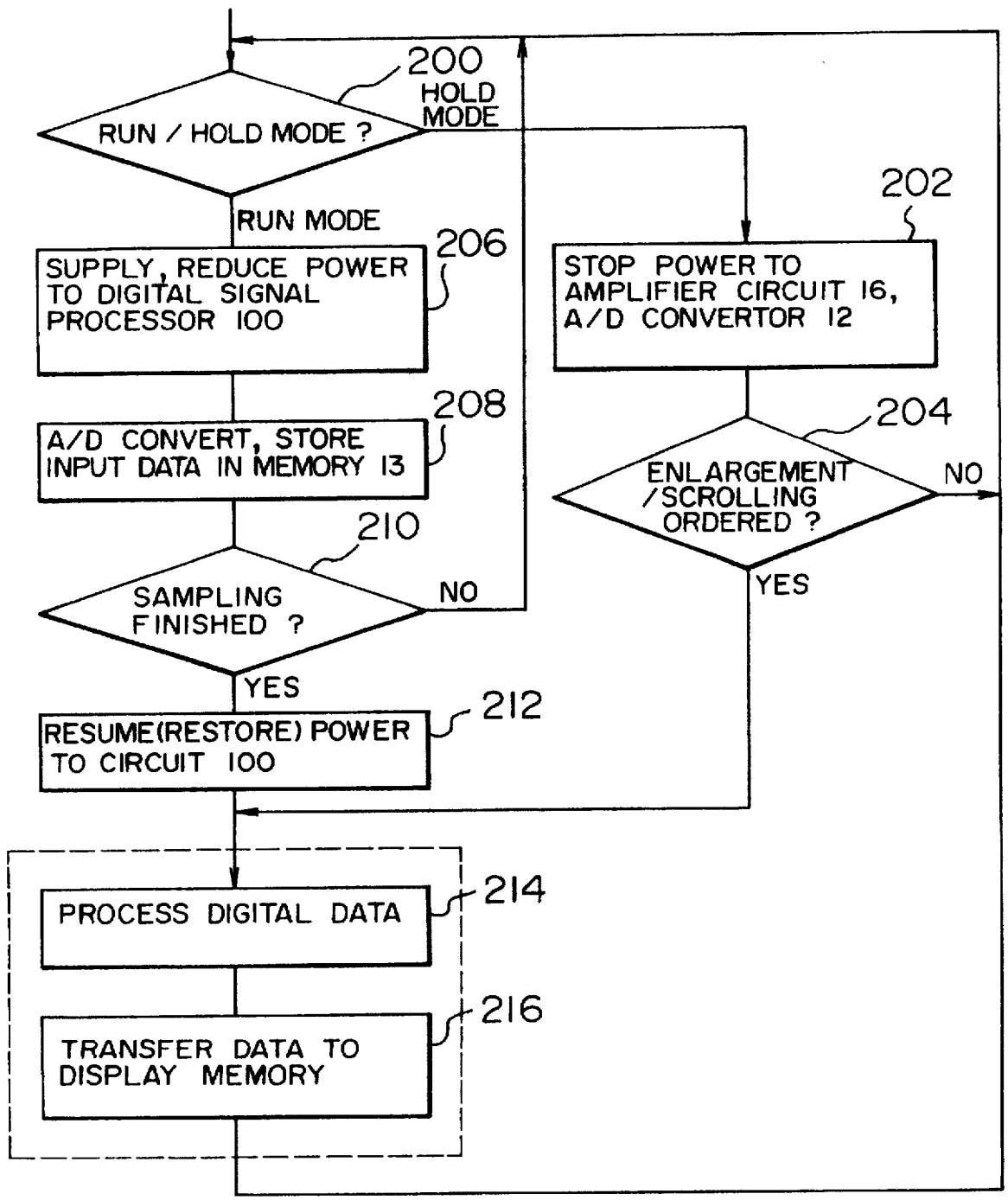

F I G. 7
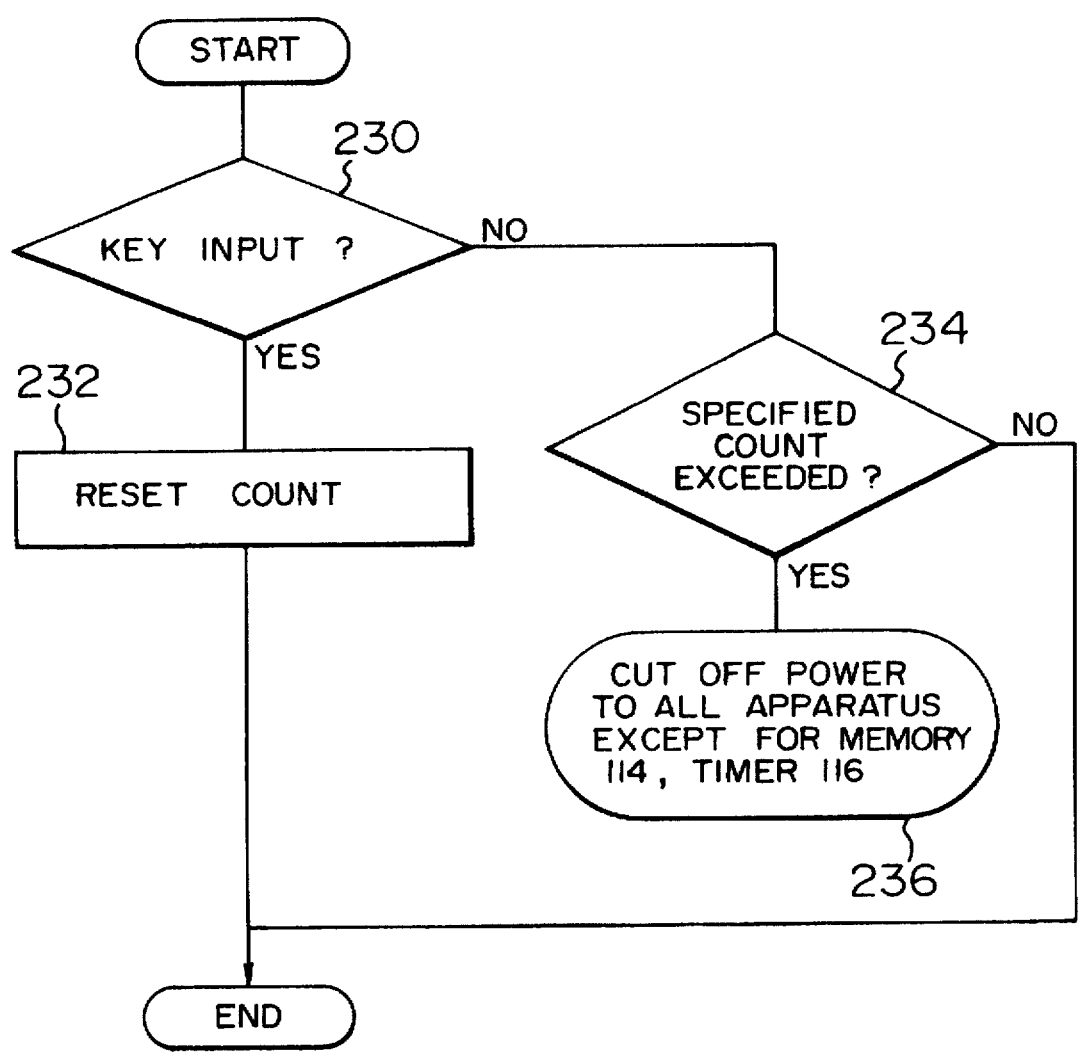

POWER SUPPLY FOR REDUCING THE POWER CONSUMPTION OF DIGITAL OSCILLOSCOPE

BACKGROUND OF THE INVENTION

1. Field of the Invention

This invention relates to a power supply and method of supplying power for a digital oscilloscope, and particularly to one in which the power consumption in the digital oscilloscope can be reduced.

2. Description of Related Art

There is known a system in which the power supply provided within an apparatus such as a portable personal computer (generally called note-type or notebook personal computer), when the keyboard is not operated for a certain time by the user, can be stopped from supplying power to or reduced in power to the circuit components of the apparatus so that the power consumption within the apparatus can be lowered. Moreover, in an electronic camera operating in a mode, power is not supplied to circuit blocks which are not associated with that operation, as described in, for example, JP-A-60-142676 (related art 1).

On the other hand, a digital oscilloscope generally includes a memory of one kilobyte or more for recording signals. A conventional portable digital oscilloscope, which is battery-operated, has a battery (power supply for main operation) for driving a display and control circuits which control the digital oscilloscope, and another battery (backup power supply) for the above-given signal-recording memory (related art 2). The provision of the battery exclusive for the signal-recording memory will increase the cost and prevent the oscilloscope from being small-sized.

The related art (1) is concerned with the reduction of power consumption in electronic cameras. The reduction of power consumption in a digital oscilloscope has almost not been considered so far, and thus the conventional digital oscilloscope consumes a large amount of power. Also, in a portable digital oscilloscope which is battery-operated, large power consumption causes the operating time to be short and thus it cannot be practically used.

In the related art (2), the above-mentioned signal-recording memory is generally an SRAM. The SRAM does not need a regulation circuit for stabilizing the voltage to the SRAM, but has a small capacity, and therefore is not suitable for the signal-recording memory. Accordingly, a large-capacity DRAM seems to be suitable for it. The DRAM, however, absolutely requires stabilization of applied voltage for refresh operation, and hence needs a regulator. The regulator consumes large power and thus must have a large capacity as a battery exclusive for the above memory. This causes the oscilloscope to be of high cost and large in size.

SUMMARY OF THE INVENTION

It is an object of the invention to provide a power supply and method of supplying power for a digital oscilloscope which can solve the above problems with the related arts.

It is another object of the invention to provide a power supply and method of supplying power for a digital oscilloscope which can reduce power consumption.

It is still another object of the invention to provide a power supply and method of supplying power for digital oscilloscope which can reduce power consumption and is suitable for making a low-cost and small-sized digital oscilloscope.

According to an aspect of the present invention, there is provided a method of supplying power in a digital oscilloscope for indicating an input signal waveform on a display, which includes a step of stopping power to all or part of the circuits which constitute the oscilloscope in accordance with at least one of an operation mode, or operating state in which the digital oscilloscope is set by the user and the other mode of the oscilloscope.

Thus, since all or part of the circuits of the oscilloscope are stopped from being powered in accordance with the set operating mode (run mode, hold mode or the like) or the operating state of the oscilloscope (the state within the apparatus), power saving in the oscilloscope can be performed.

According to an example of the present invention, it is determined whether the digital oscilloscope is not operated for more than a time set by the user, and if it is not operated for more than the set time, the power to the display is cut off.

Thus, since the display and all or a portion of the circuits of the oscilloscope can be automatically stopped from being powered when the user does not operate the oscilloscope for more than a fixed time, the power consumption can be reduced.

According to another example of the present invention, power is supplied to a circuit which samples an input signal at a predetermined time to which a timer is set, causing the circuit to sample the input signal, and it is determined whether the sampled input signal meets a certain reference value (GO/NO-GO determination standard). Then, all or part of the circuits of the oscilloscope are stopped from being powered on the basis of the result of the determination.

Thus, only when a particular waveform appears in the input signal is the input waveform automatically recorded and then power can be stopped from being supplied to part of the circuits. Therefore, the input data can be automatically picked up and also power saving can be achieved.

According to another aspect of the present invention, there is provided a digital oscilloscope for displaying the input signal waveform on the screen, which includes a charging circuit, a battery which can be charged by the charging circuit, main circuits which process the input signal and supply it to the display portion, the display portion for displaying the waveform of the input signal processed by the main circuits, a dynamic memory for storing the input signal processed by the main circuits, a converter for converting the output voltage of the battery into various different voltages and supplying them to the main circuits, and a regulating circuit for stabilizing the output voltage of the battery and supplying it to the dynamic memory.

Thus, according to this aspect of the invention, since the portable digital oscilloscope using a DRAM as the signal-recording memory has only the battery common to both the battery (main power supply) for the display and control circuits and the battery (backup power supply) for the signal-recording memory, the oscilloscope can be produced at low cost and small-sized.

According to one example of the invention, the standard voltage of the battery is 9.6 V.

According to still another aspect of the invention, there is provided a digital oscilloscope for displaying an input signal waveform on the screen, which includes a charging circuit, a battery which can be charged by the charging circuit, main circuits which process the input signal and supplies it to a display portion, the display portion for displaying the input signal waveform fed from the main circuits, a dynamic memory for storing the input signal processed by the main circuits, a converter for converting the output voltage of the battery into various different voltages and supplying them to the main circuits, a regulating circuit for stabilizing the output voltage of the battery and supplying it to the dynamic memory, a voltage detecting portion for detecting that the output voltage of the battery has been reduced to a predetermined voltage, and a unit for causing the battery to be cut off to the main circuits when the voltage detecting portion detects that the output voltage of the battery has been reduced to the predetermined voltage.

According to an example of the present invention, the predetermined voltage is slightly higher than the final voltage of the battery.

Thus, according to this aspect of the invention, since the main power supply portion is cut off with only the backup power supply portion still being operated if the voltage of the common battery which is being monitored is reduced to the level which is slightly higher than the final voltage, or since the voltage is supplied to only the signal-recording memory or a clock circuit (timer) or an operating condition data memory, the data in the signal-recording memory can be prevented from being lost because the battery power is not consumed fast, and power saving can be achieved. The operating condition data may include correction data or may be a certain address to the signal recording memory.

BRIEF DESCRIPTION OF THE DRAWINGS

FIG. 5 is a flowchart for the operation of the embodiment of FIG. 4.

FIG. 7 is a flowchart for the automatic power-off function for all digital oscilloscope in the embodiment of FIG. 6.

DESCRIPTION OF THE PREFERRED EMBODIMENTS

Embodiments of a power supply and method of supplying power for digital oscilloscope according to this invention will be described with reference to the accompanying drawings.

Figure 1:
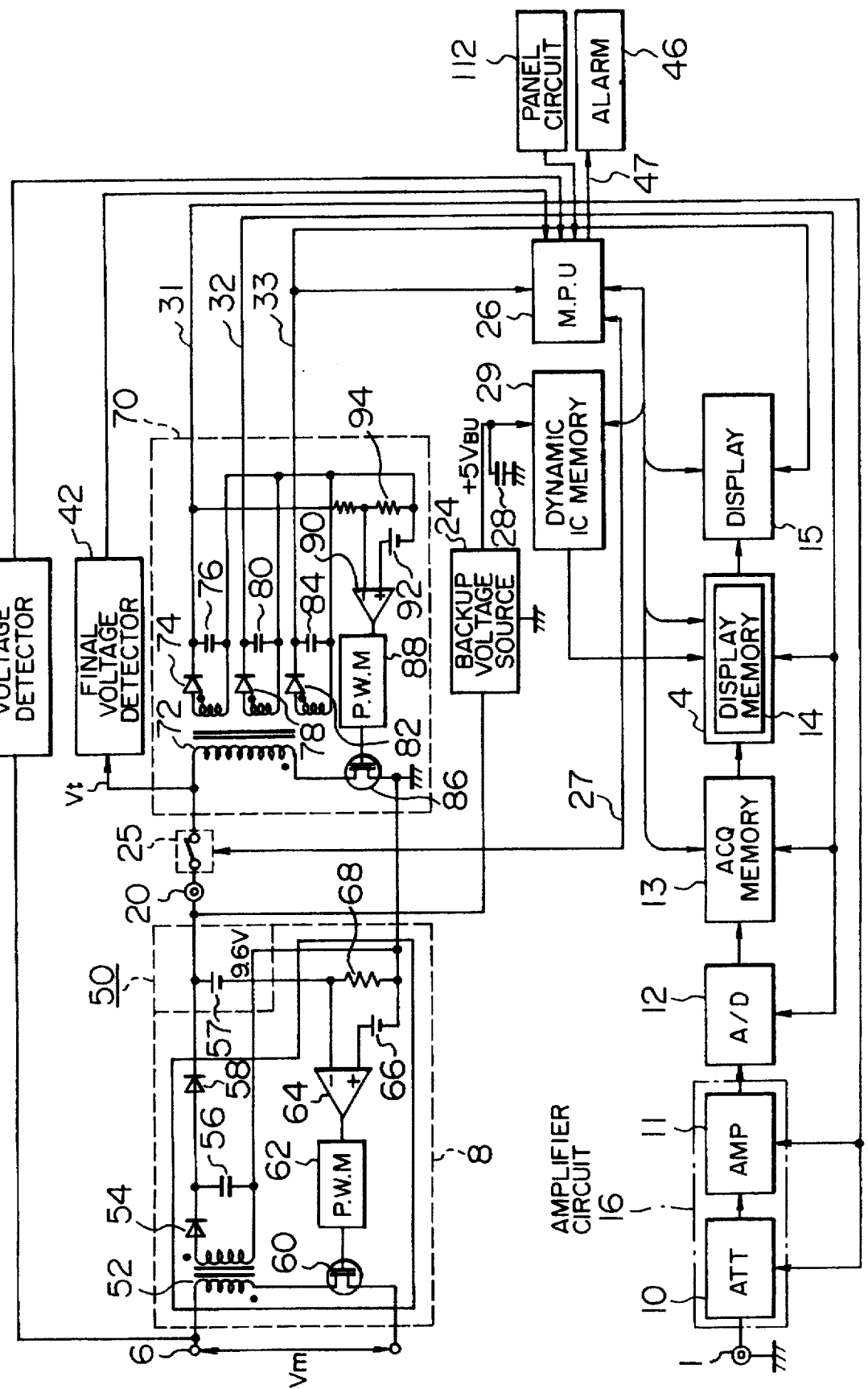
FIG. 1 is a block diagram of one example of a digital oscilloscope using one embodiment of the power supply for digital oscilloscope according to this invention.

The first embodiment of the power supply for digital oscilloscope according to this invention will be mentioned. FIG. 1 is a block diagram of one example of a digital oscilloscope, or of this embodiment. This embodiment is an application of the present invention to a portable digital oscilloscope which is battery-operated.

Referring to FIG. 1, a signal to be observed from an input terminal 1 is supplied through an amplifier circuit 16 consisting of an attenuator 10 and an amplifier 11, and through an analog-to-digital (A-D) converter circuit 12 to an acquisition (ACQ) memory 13. Then, it is processed by a microprocessor (MPU) 26 and stored in a display memory 14 of a display circuit 4. The signal being observed is indicated on a display 15. In addition, generally the digital oscilloscope has a memory, for example, an IC memory 29, for storing the observed waveform data and data set in a panel circuit 112. The arrangement of this digital oscilloscope is well known and thus its operation will not be described.

The means for supplying power to these circuits has an external power input terminal 6, a power supply 50 which includes a battery 57 and which can charge it when the input terminal 6 is connected to an external power supply, and a converter, for example, a multioutput DC-DC converter 70 to which power is supplied from the power supply 50 through an output terminal 20 and a power switch 25 and which generates various different output voltages on the basis of the power from the power supply 50.

The power switch 25 is closed by the user when the oscilloscope is used and opened by the user when it is not used. In addition, it is automatically opened by the MPU 26 under a certain condition as described later.

The power supply for a digital oscilloscope is required to supply various different voltages to the circuit blocks, or a voltage to the analog circuits 10, 11 for attenuating or amplifying the observed signal to an appropriate level, a voltage to the digital circuits 12, 13, 14, 26 for converting the analog signal into a digital signal and digitally processing it, and a voltage to the display circuit 4 for displaying the processed signal.

The multioutput DC-DC converter 70 shown in FIG. 1 converts the input voltage into voltages which are applied to these main circuits.

The IC memory 29 must be a large-capacity memory for storing the observed signal and the set data from the panel circuit 112, and thus it is preferably a DRAM. In addition, a backup function must be provided in order to store these data even after the power switch 25 is turned off. Therefore, a power circuit is necessary for continuously supplying a voltage $V_{BU}$ of, for example, +5 V to the IC memory 29. This power circuit is a backup voltage source 24 shown in FIG. 1.

Here, the IC memory 29 is a dynamic type IC memory which has a refresh circuit incorporated. Thus a power regulator or a stabilizing power supply of +5 V ±10% is necessary for operating the incorporated circuit. Therefore, it is necessary to provide a regulator for stabilizing the voltage to the IC memory. Since the regulator consumes a large amount of power, the battery for operating the IC memory is required to be a large-capacity battery. Thus, in this embodiment a common battery is used common to the power for the display 15 and control circuits and to the power for the IC memory, thereby realizing an oscilloscope of low cost and small size. The battery 57 for this purpose must be incorporated in the oscilloscope and always supply a backup voltage of +5 V to the IC memory 29 irrespective of whether the power switch 25 is turned on or off. Therefore, in this embodiment the backup voltage source 24 must be a serially controlled type regulated power supply connected directly to the battery 57.

The power supply 50 has a battery charger 8 of well-known flyback system and the battery 57 which can be charged by the battery charger 8. The battery charger 8 has a transformer 52 of which the primary winding is connected to the external power input terminal 6, diodes 54, 58, a capacitor 56, a switching transistor 60, a pulse-width modulator (PWM) circuit 62, an operational amplifier 64, a reference voltage source 66 and a resistor 68. In addition, it charges the battery 57 when the input terminal 6 is connected to the external power supply. The reference voltage 66 can be obtained by, for example, dividing a voltage within the PWM 62.

The power input terminal 6 is connected to an AC adaptor (for example, an AC adaptor for converting AC 100 V into DC 12 V) not shown.

The multioutput DC-DC converter 70 is normally of the flyback system or forward system.

The DC-DC converter 70 shown in FIG. 1 is of the flyback system, and has a transformer 72 of which the primary winding is connected to the power switch 25, diodes 74, 78, 82, capacitors 76, 80, 84, a switching transistor 86, a PWM circuit 88, an operational amplifier 90, a reference voltage source 92, and a resistor 94. The DC-DC converter 70 supplies three different output voltages through voltage lines 31, 32, 33. The reference voltage 92 can be obtained by, for example, dividing a voltage within the PWM 88. The voltage line 31 is used to supply a voltage of, for example, +8 V to the attenuator 10 and amplifier 11. Although not shown, a voltage of −8 V is also applied to these analog circuits. The voltage line 33 is used to supply a voltage of +5 V to digital circuits of the microprocessor 26, analog-to-digital converter 12, acquisition memory 13 and display circuit 4. In addition, if necessary, a voltage regulating circuit is provided in the analog-to-digital converter 12 which is sensitive to the variation of source voltage. The voltage line 32 is used to supply to the display 15 a voltage of, for example, 25 V (a plurality of different voltages are sometimes necessary depending on the specification of LCD) when the display 15 is of LCD (liquid crystal display) or a voltage of, for example, 2 kV or 10 kV when the display is of CRT. The dynamic IC memory 29 is supplied with a backup source voltage of 5 V, several tens of μA through the backup voltage source 24 even when the power switch 25 is in the on or off state.

The battery 57 in this embodiment will be described below.

The main loss in the multioutput DC-DC converter 70 includes the conversion loss in the transformer 72 and the losses in switching elements 86, 88 and rectifying elements 74 through 84. The efficiency of power utilization is not so affected by the voltage value on the power supply side.

On the other hand, since the backup voltage source 24 generates a single output voltage, a three-terminal regulator is often employed which can be formed of a small number of components and thus a necessary regulated power supply can be achieved with ease. However, the three-terminal regulator causes power loss according to the relation of (supply voltage—output voltage) X load current as is well known. Therefore, the loss is increased with the increase of the difference between the source voltage and the output voltage, and hence the efficiency is almost affected by the voltage value of the power supply. In addition, the necessary minimum input-output voltage difference of the normal three-terminal regulator is about 2 V. Therefore, for the output voltage of +5 V (of ±10% for operating the dynamic type IC memory 29), the input voltage for minimum loss is 7 V, and practically the minimum supply voltage is necessary to be 7 V or above.

The battery 57 as one of the power sources, when a Ni—Cd battery is used for it, has its discharged final voltage set to 0.9 V/cell through 1.0 V/cell for battery protection relative to the standard voltage value 1.2 V/cell, and its full-charged voltage set to 1.4 V/cell through 1.5 V/cell. As a result, the voltage range of the battery is from 0.9 V/cell to 1.5 V/cell.

If it is assumed that the battery voltage is 7 V, the battery cannot be used under 7 V and thus it is not useful. Thus, the most efficient system for the battery should consider the backup for the memory 29 as follows. The final voltage (at which alarm occurs, cutting off the power to the oscilloscope) of the battery 57 is selected to be a voltage of 8 V, and the voltage range for holding the memory 29 to be backed up is established to be about from 8 V to 7 V.

In order to assure the final voltage of 8 V, the battery 57 is constructed by eight Ni—Cd cells. Thus, an output voltage range from 7.2 V to 12 V can be obtained by charge and discharge of battery 57. Therefore, if the standard voltage value is 1.2 V/cell, the battery 57 as a power supply can have a standard voltage value of 9.6 V.

If the battery 57 is constructed by seven cells, the total voltage becomes lower than the final voltage (8 V) even though the unit cell has the final voltage or above. If it is constructed by nine cells, the loss increases as described above and hence the amount of heat generation is large,thus making it impossible to use the battery for a portable purpose. The number of cells to be used should be decreased in terms of weight.

The choice of 9.6 V for the standard voltage value of battery 57 will be rational for the following reasons.

This value is most suitable for the backup voltage source to the IC memory. The incorporated circuits of the IC memory need a backup voltage source of +5 V ±10% precision for their operation. This requirement can be met by applying the standard voltage of 9.6 V to the three-terminal regulator 24. That is, a voltage of 7 V or above as the lowest supply voltage can be applied to the regulator so that an output voltage of 5 V or above can be produced from the regulator. In addition, if a Ni—Cd battery of which the standard voltage value is 1.2 V/cell is used for its characteristics, the lowest supply voltage of 7 V cannot be selected as the battery voltage because the battery voltage is suddenly decreased at 7 V or below and thus the final voltage is selected to be 8 V. For this purpose, eight Ni—Cd cells (of which the standard voltage value is 1.2 V/cell) are used to form a battery of which the standard source voltage is 9.6 V. Thus the voltage range of this battery upon discharge and charge is from 7.2 V to 12 V as mentioned above.

In the digital oscilloscope which needs various different voltages for its circuit blocks and particularly which is battery-operated, selection of 9.6 V for the standard source voltage can increase the efficiency of the whole system.

A description will be made of the arrangements for preventing the memory 29 from loss of its data due to the consumption of battery 57 and for power saving of the oscilloscope in this embodiment.

In this embodiment, there are also provided a voltage detector 40 for detecting the voltage applied to the input terminal 6, a final voltage detector 42 for detecting an output voltage Vt of battery 57 which is applied through the input terminal 20 and power switch 25 to the DC-DC converter 70, and an alarm 46 which is responsive to a signal 47 from the MPU 26 to give a warning. The detected voltages from the voltage detectors 40 and 42 are supplied to the MPU 26. The MPU 26 responds to these detected voltages to generate the signal 47, actuating the alarm 46 and to supply a signal 27 to the power switch 25, controlling it. The alarm 46 may be replaced by an LED or like which is energized, warning the user to charge the battery 57.

Figure 2:
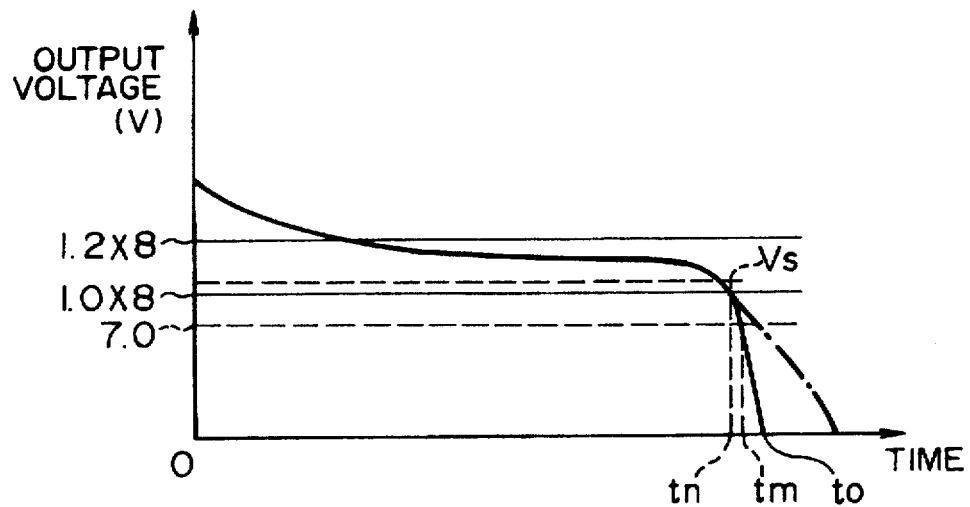
FIG. 2 is a graph showing one example of the characteristic of the battery used in the power supply of the digital oscilloscope of FIG. 1.

FIG. 2 shows the output characteristic of the battery 57 of, for example, eight Ni—Cd cells (the standard voltage value of which is 9.6 V) used in this embodiment. As shown in FIG. 2, the output voltage of the battery is gradually decreased with time and it reaches the final voltage of 8 V at time tn and the lowest supply voltage of 7 V at time tm. The output voltage is suddenly lowered at the final voltage or below. Thus, the data of the IC memory 29 will be lost if this battery is left in this condition.

Figure 3:
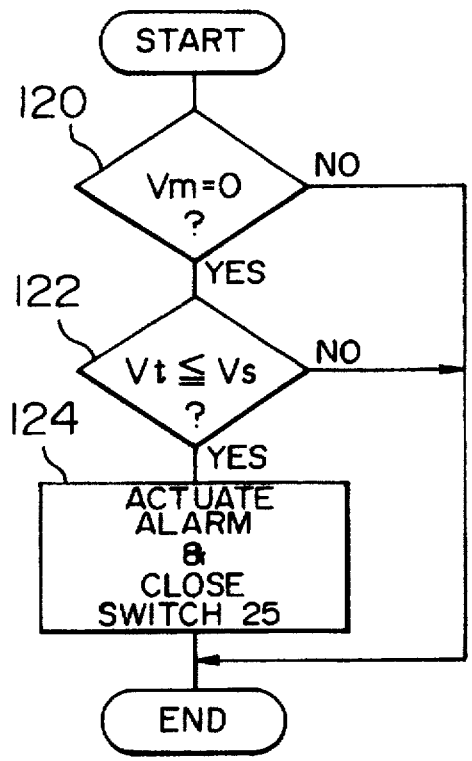
FIG. 3 is a flowchart for the operation of the power supply of the digital oscilloscope of FIG. 1.

In this embodiment, according to the flowchart of FIG. 3, the voltage detector 40 detects that the battery 57 is not charged by the external power supply (that is, the detected voltage Vm at the input terminal 6 is 0 V) (step 120). Also, the final voltage detector 42 detects that the voltage Vt of the battery 57 has been reduced to a predetermined value Vs (step 122). At this time, the MPU 26 generates the signal 47, actuating the alarm 46 and supplies the signal 48 to the power switch 25, opening it (step 124). Even when the switch 25 is open, the backup voltage source 24 is still connected directly to the battery 57 and thus continuously supplies power to the memory. The operation shown in FIG. 3 is performed at every certain periods of time. When the alarm 46 is actuated, warning the user that the battery voltage of the oscilloscope has decreased, the user connects the external power supply to the external input terminal 6, thereby charging the battery. In addition, when the switch 25 is opened, the battery is stopped from supplying power to the main circuits of the oscilloscope, or the main operating power source to the oscilloscope is cut off. Thus, as indicated by the one-dot chain line in FIG. 2, the voltage reduction rate of the battery can be lowered with the result that the battery life can be extended. As compared with the case in which the switch 25 is left closed, the voltage applied to the IC memory 29 can be maintained to be the lowest supply voltage of 7 V or above for a long time. In this embodiment, time interval to-tm is about 14 days. Therefore, the data of the IC memory can be prevented from being rapidly lost by the voltage reduction of battery 57.

When the battery 57 is charged by the external power supply, the IC memory 29 is also powered by the external power supply. In this embodiment, a capacitor 28 is connected to make it possible to continuously supply the source voltage to the IC memory 29 even during the exchange of battery 57. If the capacitance of the capacitor 28 is one farad, this capacitor serves as a voltage source for a time interval of about 8 minutes, maximum, during which time interval the battery exchange can be made. In other words, the content of the IC memory 29 is not lost until about eight minutes, maximum, passes after the battery 57 is disconnected.

The predetermined voltage Vs is selected to be slightly larger than 8 V. This is because if the voltage value Vs is selected to be slightly lower than 1.2×8=9.6 V but higher than 8 V, the battery is required to be early charged, thus the voltage Vs being unstable due to the memory effect of the battery. Thus, in this embodiment, the voltage Vs is selected to be somewhat larger than 8 V as shown in FIG. 2.

According this embodiment, in the portable digital oscilloscope using a DRAM for the signal-recording memory, the battery for driving the display and control circuits (main operation power supply) and the battery for driving the signal-recording memory (backup power supply) are replaced by a single battery, which makes it possible to reduce the cost and size of the oscilloscope. In addition, the voltage of the common battery is monitored. When the battery voltage is lowered to a level which is a predetermined value higher than the final voltage, the main operation power supply portion is cut off but only the backup power supply portion remains active, or only the signal-recording supply portion is powered. Therefore, the data of the signal-recording memory can be prevented from being lost due to the voltage reduction of the battery, and the power to the oscilloscope can be saved.

Figure 4:
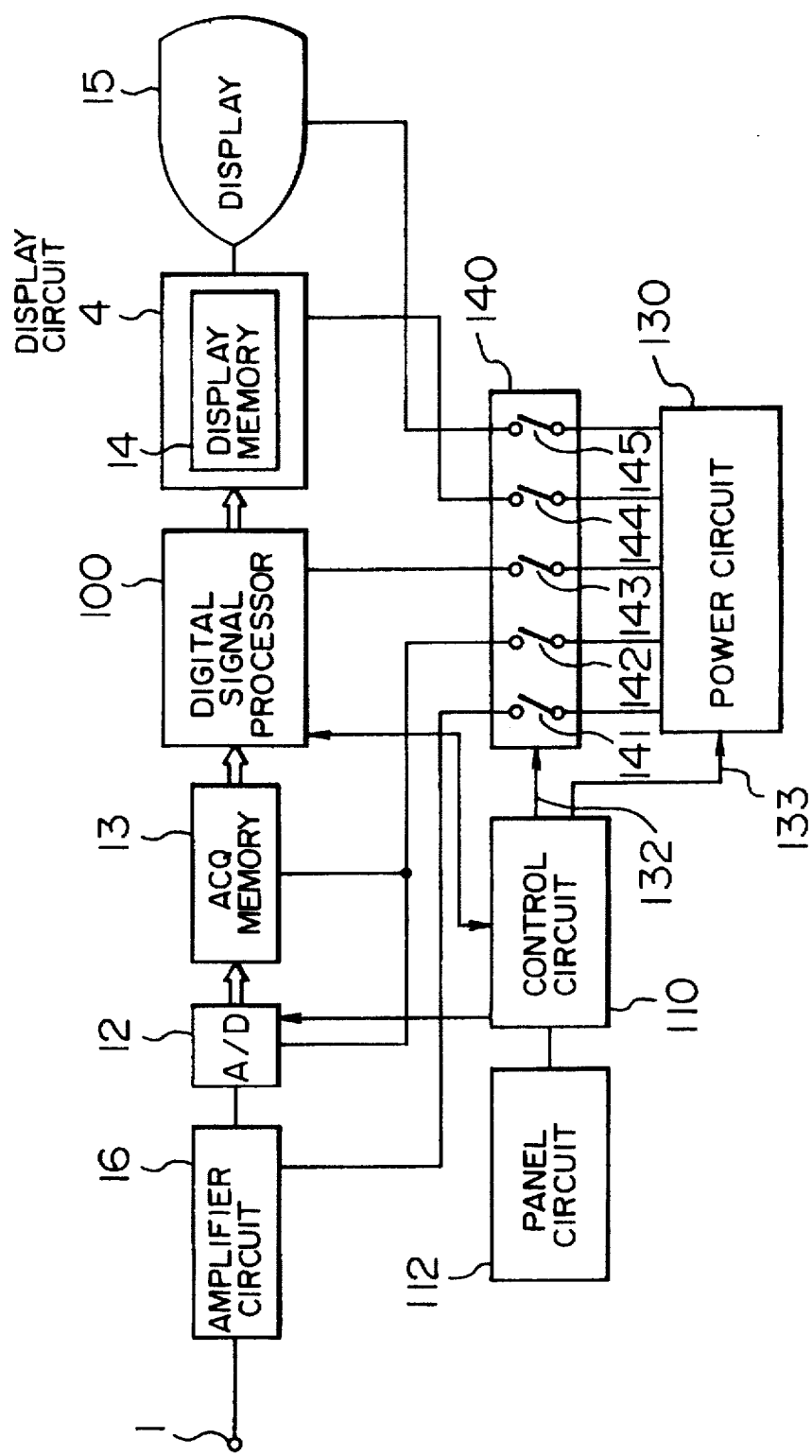
FIG. 4 is a block diagram of one example of a digital oscilloscope using another embodiment of the power supply for digital oscilloscope according to this invention.

With reference to FIGS. 4 and 5, another embodiment of the invention will be described in which the power consumption in the digital oscilloscope can be reduced in its certain set mode.

FIG. 4 is a block diagram of this embodiment. In FIG. 4, like elements corresponding to those in FIG. 1 are identified by the same reference numerals and will not be described.

Referring to FIG. 4, there is shown a digital signal processing circuit 100 which makes a certain arithmetic process to the digital data from the acquisition memory 13 and supplies its output to the display circuit 4. This digital signal processing circuit 100 has a function corresponding to part of the functions of the MPU 26 shown in FIG. 1. The panel circuit 112 has switches for setting and changing the time axis and vertical axis on the display screen of the oscilloscope, switches for enlargement and scrolling and switches for setting the hold mode and run mode. This panel circuit 112 has also a function for supplying these set data to a control circuit 110. A power circuit 130 may be formed of the power supply 50 and the DC-DC converter 70 as shown in FIG. 1 when the oscilloscope of this embodiment is of portable type. When it is not of portable type, the power circuit may be formed of the DC-DC converter 70 shown in FIG. 1, of which the primary winding is connected to the AC power supply. In either case, the power circuit 130 supplies various different voltages through a switch circuit 140 to the circuit blocks 12, 13, 14, 15, 16, 100, in a similar way to the embodiment of FIG. 1.

The switch circuit 140 has switches 141 through 145 which are turned on or off under the control of the control circuit 110 so that the source voltages from the power circuit 130 can be supplied to the circuit blocks 16, 12, 13, 100, 14, 15 or cut off.

The control circuit 110 is formed of a CPU and a memory (ROM, RAM) not shown, and it has a function (corresponding to part of the functions of the MPU 26 in FIG. 1) for the normal control of digital oscilloscope under which the signal processed by the digital signal processing circuit 100 is indicated on the display 15, and a function for the following power saving control. In other words, the control circuit 110 is responsive to the setting information from the panel circuit 112 to control the switches 141 through 145 of the switch circuit 140 so that the respective circuit blocks can be selectively powered. The control circuit 110 delivers setting information such as a sampling frequency based on the setting information supplied from the panel circuit 112 to the digital signal processor 100. The processor 100 delivers responding information such as information representing termination of the sampling to the control circuit 100.

In this embodiment, when the setting information from the panel circuit 112 is, for example, the so-called hold mode in which the digital oscilloscope does not renew the waveform displayed on the digital oscilloscope, or when the oscilloscope is moved to this hold mode according to this information, the source voltages to the input circuits which are not required to operate are stopped from being fed.

FIG. 5 is a flowchart for part of the operation of the oscilloscope of this embodiment, or for the operation from the A-D conversion to the display processing.

In the oscilloscope, usually the input wave to be observed from the input terminal 1 is converted into a digital signal, sampled, fed to the memory 13, processed in the digital signal processing circuit 100 and displayed on the screen, in turn. This operation is called run mode.

Only a particular one of the successive input waves is sometimes desired to be continuously observed. In that case, when the digital signal of the particular waveform is completely sampled, this particular waveform is processed in the digital signal processing circuit 100 and then repetitively displayed. The later A/D conversion and sampling of a new waveform are not performed. This operation is called hold mode. This hold mode is generally known as a function which is not present in the analog oscilloscope but is peculiar to the digital oscilloscope.

In this embodiment, when the oscilloscope turns to the hold mode, power to the amplifier 16 and A-D converter circuit 12 which are not necessary to operate is stopped. In the run mode, since the digital data is not required to be processed and displayed until the sampling process is finished, the voltage to the digital signal processing circuit 100 is reduced or stopped.

The operation of this embodiment will be mentioned with reference to the flowchart of FIG. 5. This operation is executed by the CPU of the control circuit 110 at each constant time (for example, one minute).

First, the control circuit 110 decides whether the set mode is run mode or hold mode from the setting information from the panel circuit 112 (step 200).

If it is run mode, the voltage applied to the digital signal processing circuit 100 is reduced or stopped. When the voltage is reduced, a control signal is fed through a control line 133 to the power circuit 130, controlling it so that the voltage to the digital signal processing circuit 100 can be reduced (step 206). When the voltage to the digital signal processing circuit 100 is stopped, a control signal is supplied through a control line 132 to the switch circuit 140, causing the switch 143 to open (step 202).

Then, the input signal to be observed is supplied through the amplifier circuit 16 to the A-D converter circuit 12 where it is converted into a digital signal, and the digital signal is sampled and stored in the acquisition memory 13 (step 208).

Thereafter, decision is made of whether the waveform to be displayed has been sampled or not (step 210). The above operations are repeated until the sampling process is completed.

When the sampling process is completed, a control signal is produced on the control line 132 or 133 in order to resume the supply of voltage to the digital signal processing circuit 100 (step 212).

Then, the digital data stored in the memory 13 is processed in the digital signal processing circuit 100 (step 214), transferred to the display memory 14 and indicated on the display 15 (step 216).

When the set mode is decided to be hold mode from the setting information from the panel circuit 112 (step 200), the hold mode is performed. In the hold mode, the data which is already sampled, processed and stored in the display memory in the run mode is repetitively displayed. Since the sampling process is not performed, the control circuit 110 supplies a control signal through the control line 132 to the switch circuit 140, thereby opening the switches 141, 142 so that the power to the amplifier circuit 16 and A-D converter circuit 12 can be stopped (step 202).

Subsequently, decision is made of whether the enlargement or scrolling of the displayed waveform is ordered or not from the setting information from the panel circuit 112 (step 204). If it is not so, the program goes back to step 200. If the enlargement or scrolling is ordered, the program goes to steps 214, 216, where the displayed waveform is enlarged or scrolled after the corresponding process.

If the oscilloscope is released from the hold mode, the control signal is fed to the switch 140, closing the switches 141, 142 so that the power to the amplifier circuit 16 and A-D converter circuit 12 can be resumed.

With reference to FIGS. 6, 7, 8 and 9, still another embodiment of the invention will be described in which the power consumption in the digital oscilloscope is reduced according to the operated state.

Figure 6:
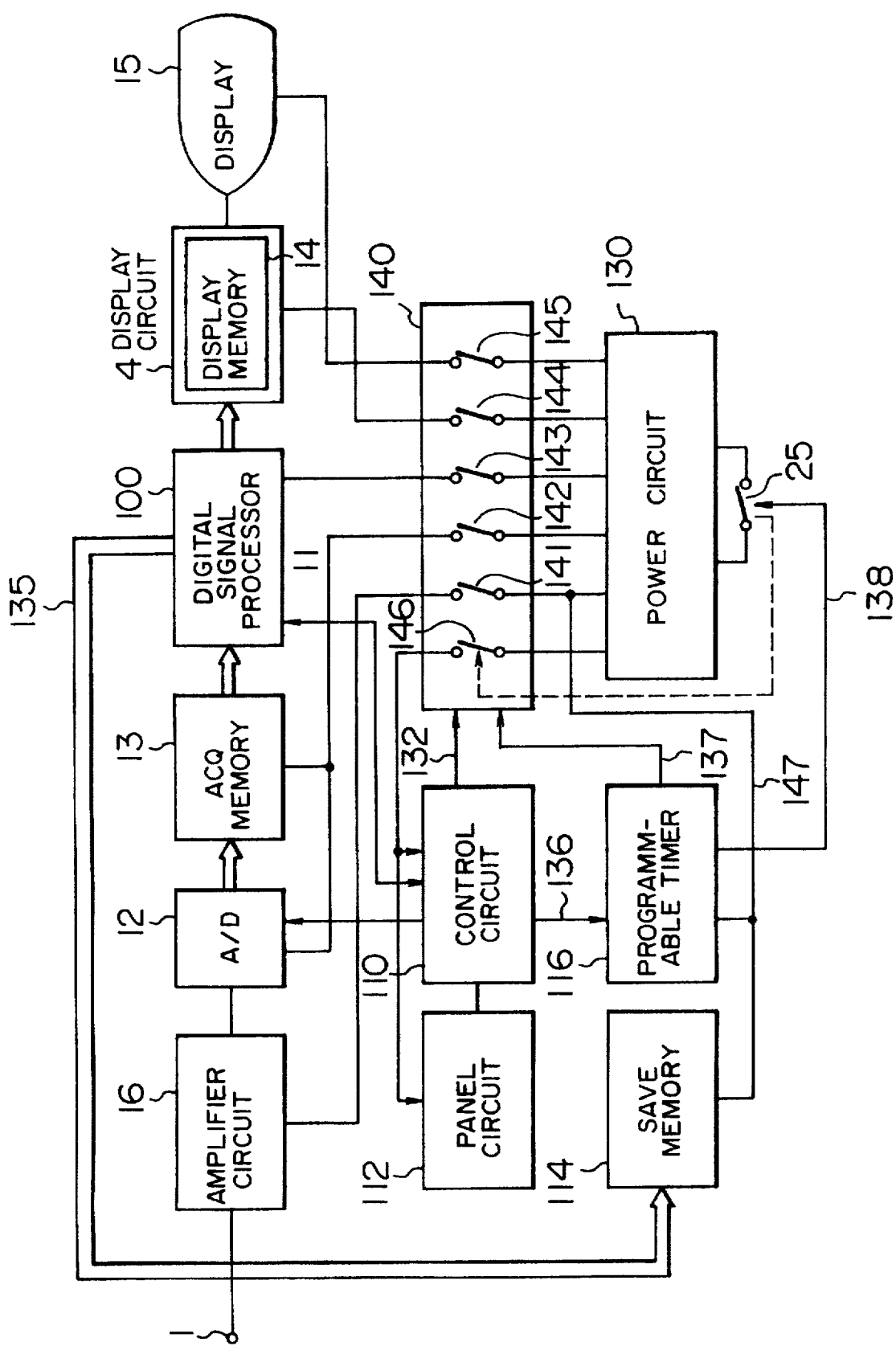
FIG. 6 is a block diagram of one example of a digital oscilloscope using still another embodiment of the power supply for digital oscilloscope according to this invention.

FIG. 6 is a block diagram of this embodiment. In FIG. 6, like elements corresponding to those in FIG. 4 are identified by the same reference numerals and will not be described. This embodiment, in addition to the components of embodiment of FIG. 4, has a save memory 114 for storing the digital data fed through a data line 135 from the digital signal processing circuit 100, and a programmable timer 116. The save memory 114 corresponds to the IC memory 29, and thus the save memory 114 may be always powered by the backup voltage source 24 not shown, as in the embodiment of FIG. 1.

First, each power saving function of this embodiment will be described.

In this embodiment, the programmable timer 116 is used to make on/off control of all/part of the oscilloscope. Specifically, the following operations are made.

(1) It turns the power supply on/off to all oscilloscope except the save memory 114 and programmable timer 116 or (2) It turns the power supply on/off to only the display circuit 4.

These control operations are made according to the following states in which the oscilloscope is used.

(1) The key operation (switch operation) on the panel circuit 112 is not performed for a constant time (for example, one through sixty minutes). (In this case, the source voltage to all oscilloscope or only the display is turned off/on)

(2) The input waveform sampling is started by means of the timer, or in an unmanned manner. (in this case, periodically (for example, every several days, for several minutes) the voltage source to all oscilloscope or only the sampling circuit (and the associated circuits) is turned on at a specified time so that the waveform is sampled)

(3) The sampled waveform data are selectively picked up. (In this case, only when a certain particular feature (for example, noise exceeding a specified characteristic level) appears in the input waveform, the input waveform is recorded and then the voltage source to all oscilloscope or the sampling circuit (and the associated circuits) is turned off)

The function for the above item (1) will be first mentioned with reference to the flowchart of FIG. 7. This function is carried out by the control circuit 110 when an auto power off mode is set on the panel circuit.

When the power switch 25 is closed, the programmable timer is reset in its count and then counts at a certain period until a reset signal is fed through the signal line 136 from the control circuit 110.

When the power switch 25 is closed, the switch 146 of the switch circuit 140 is also closed, permitting the control circuit 110 to be powered together with the panel circuit 112. Then, when keys on the panel circuit are operated, the associated information is supplied to the control circuit 110, and the control circuit 110 supplies a reset signal to the programmable timer 116.

Therefore, the control circuit 110 makes the following processes at each certain time period.

First, the control circuit 110 decides whether a key input (setting information) is generated or not from the panel circuit 112 (step 230). If a key input is produced, the control circuit 110 supplies the reset signal 136 to the programmable timer 116, resetting its count (step 232).

If a key input is generated, it decides whether the count of the programmable timer 116 has reached a specified value or above (step 234). This specified count (designated time: for example, 1 through 60 minutes) is set on the panel circuit 12 and fed through the control circuit 110 to the programmable timer 116 in which it is set.

If the count is the specified value or above, or if key operation is not made yet on the panel circuit 112 for a certain time or above, a signal is fed from the programmable timer 116 through the control line 137 to the switch circuit 140, thereby opening the switches 141 through 146 so that the associated circuit blocks can be de-energized. That is, for example, the voltage sources to all oscilloscope except the save memory 114 and programmable timer 116 are cut off. The signal for controlling these switches 141 through 146 may be supplied from the control circuit 110 through the signal line 132 to the switch circuit 140.

If a key input is produced, the count of the programmable timer 116 is reset.

Thus this function can make power saving in the oscilloscope because all oscilloscope except a part is de-energized when key operation is not made for a certain time.

Figure 8:
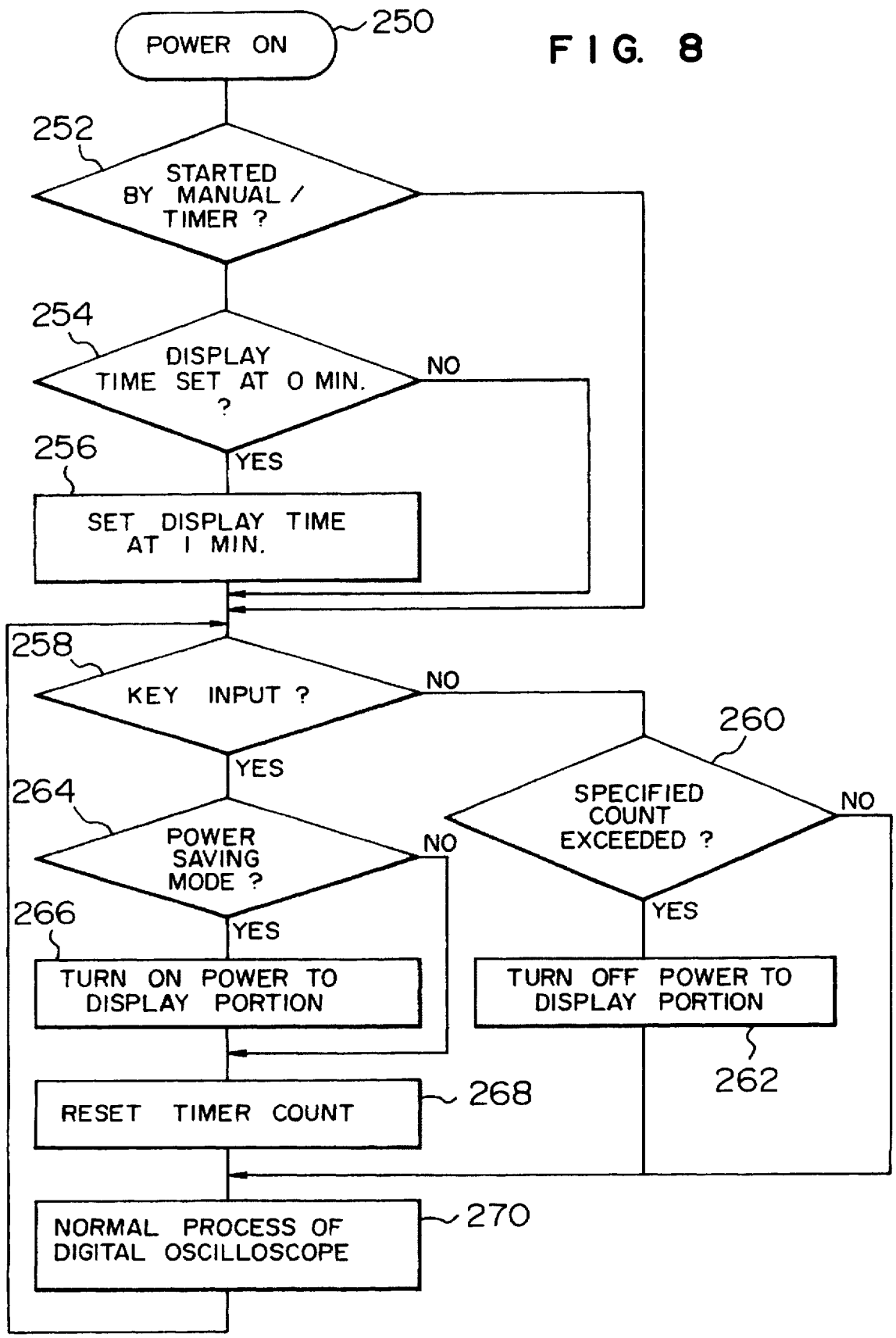
FIG. 8 is a flowchart for the automatic power-off function for the display in the embodiment of FIG. 6.

The function for the above item (2) will be described with reference to the flowchart of FIG. 8. This function is performed by the control circuit 110 for, for example, each predetermined time period when a stand-by mode is established on the panel circuit.

Some digital oscilloscope picks up input waveform data by use of a timer or in an unmanned manner (automatically). In this case, since the waveform is not required to be displayed, power is not supplied to the display portion (display and display circuit). Thus when key operation on the panel circuit 112 is not made for a certain time or above, this function stops power to only the display portion 4, 15 and records the input waveforms. Also, when key operation is made after the stop of power to the display portion, the display portion is again powered.

The power saving mode in which power to the display portion is controlled to be on or off will be mentioned below.

First, when the control circuit 110 detects that it has been energized (step 250), it decides whether this energizing, namely the closed circuit of the power switch 25 has been brought about by the manual operation of the user (manually started) or by the timer function of the programmable timer 116 (started by timer) (step 252). If the power switch 25 is closed by the timer, the following process is made. When a start time is established in advance by the panel circuit 112, this set start time is fed through the control circuit 110 to the programmable timer 116 and set in the timer. Also, a flag for start of timer is set in the timer. Thus the timer, after the lapse of the set time, supplies a signal through the signal line 138 to the power switch 25, closing the switch 25.

Therefore, at step 252 the decision of whether it is caused by timer or manual operation is performed by reading the flag which is fed to the control circuit 110 from the timer 116 through the signal line 136.

If it has been started by timer, it is confirmed whether key input has been made or not (step 258).

If it has been started by manual operation, it is confirmed whether the time set by the panel circuit 12 is 0 or not, namely whether the input waveform is not indicated on the display 15 (step 254). If the set time is not 0 (, or one minute or above), the program goes to step 258.

If the set time is 0 minute, the displaying time on the display is fixed to, for example, one minute and the programmable timer 116 is set at this value (step 256).

Then, it is confirmed whether key input has been made on the panel circuit 112 (step 258).

If key input is not made, decision is made of whether the count of the programmable timer 116 has reached the set time (specified count) (step 260). If it has not reached yet to the set time, the program goes to step 270, where the oscilloscope makes the normal processes. If it has reached to the set time, the display portion is de-energized. (step 262). In other words, the program timer or the control circuit supplies a control signal through the signal line 137 or 132, opening the switches 144, 145 to de-energize the display 15. That is, the power saving mode is brought about.

If key input is made on the panel circuit 112, decision is made of whether the power saving mode is already brought about (step 264). If the power saving mode is already brought about, the display portion is again powered since key input has been made (that is, the switches 144, 145 are closed) (step 266). Then, the count of the programmable timer is reset (step 268).

At step 264 if it is decided that the power saving mode is not brought about, the program goes to step 268. After execution of step 268, the program goes to step 270.

Thus, in the case of picking up data in an unmanned manner, this function cuts off the power to the display portion if key operation is not made for a certain time, thus making power saving. Particularly when an LCD (liquid crystal display) is used for the display, this function can effectively make power saving because the ratio of the power consumption in the LCD and its back light to that in all oscilloscope is large (about 40%).

Figure 9:
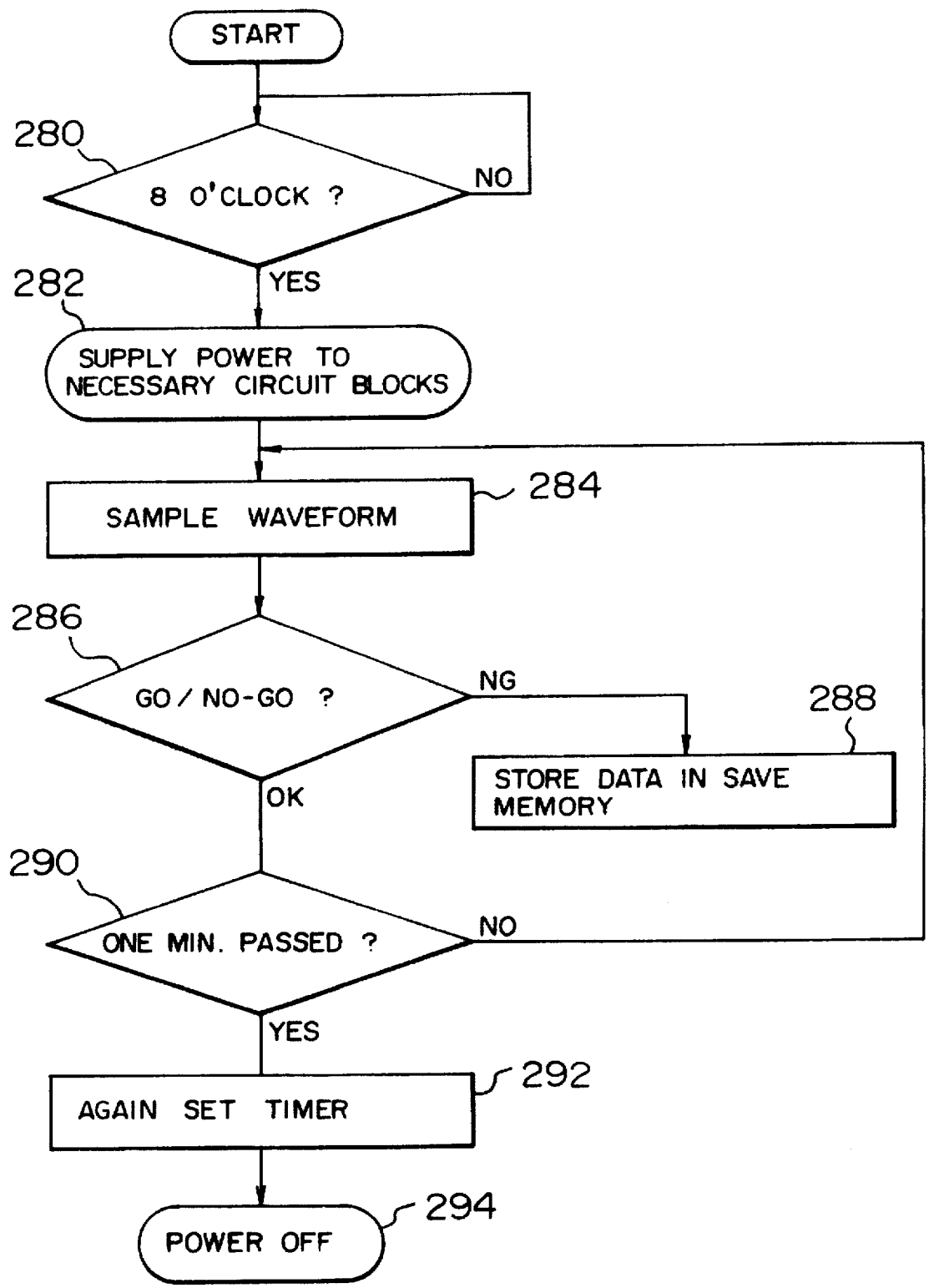
FIG. 9 is a flowchart for the automatic data-pickup function of a timer in the embodiment of FIG. 6.

The function for the above item (3) will be mentioned with reference to the flowchart of FIG. 9. This function makes only the necessary circuits of the oscilloscope be powered only if a particular feature (e.g., an abnormal waveform) appears in the input waveform. When an alarm mode is established on the panel circuit, this function is performed by the control circuit 110 at, for example, each certain time period.

The well-known criteria for selectively picking up the sampled waveform data are, for example, the GO/NO-GO (or YES/NO) decision technique described in, for example, U.S. Pat. No. 4,510,571. In this technique, before making a decision, criteria are set and decision is made of whether the input waveform data meet the criteria or not. Then, in accordance with the decision result, the waveform data collection is made by storing the waveform data in a collection memory (generally called save memory) of apparatus or recording it on paper by printer.

In the prior art the input data is compared with the criteria and theoretically decided to be picked up or not before being stored. Thus it is difficult to pick up the input data over a long time because the capacity of the save memory and the length of recording paper on a printer are limited. In addition, the input data cannot be selectively picked up at each constant time period. Moreover, since the respective circuits of the conventional oscilloscope are powered even if the input data is not picked up, the battery-operated type cannot collect only a small amount of data.

This function is as follows. The time point or time interval at or in which the input waveform is desired to collect is selected by the panel circuit 112 and set in the programmable timer 116. Then, at this, set time or after the lapse of this time interval, the circuit blocks necessary for data collection are energized so that the input data can be collected. After data collection these circuit blocks are automatically de-energized. When the set time or time interval comes, the necessary circuit blocks are energized so that the input waveforms can be collected. Therefore, waveform data at each constant time period can be collected over a long time, and the power consumption can be reduced.

If, for example, it is desired to collect the input waveform data for a time interval, e.g., one minute from eight o'clock in every morning, information of "eight o'clock in every morning" as the time at which the user desires to collect the input data is established in the programmable timer 116 through the panel circuit 112. In addition, the data within (or out of) the criteria (for example, the GO/NO-GO decision) is set in the memory of the control circuit 110. The timer is also set so that when the set time comes, the input data which does not meet the criteria (that is, abnormal input data) is collected from the set time and stored in the save memory 114 with the necessary circuit blocks being de-energized one minute thereafter.

After these settings are completed, the power switch 25 is manually turned off. Under this state, the circuits of the oscilloscope except the programmable timer 116 and save memory 114 are not powered and thus the power consumption can be decreased.

This function will be described with reference to FIG. 9.

First, under the state in which the power switch 25 is closed, decision is made of whether the set time, or eight o'clock in the morning has come or not (step 280). If eight o'clock in the morning has come, a signal is fed from the programmable timer 116 through the signal line 137 to the switch circuit 140, closing the switches 141 through 143 and 146 so that the necessary circuit blocks for data collection except the display portion are energized (step 282).

Thus, the input waveform data is started to sample, and the digital signal from the A-D converter is supplied to the digital signal processing circuit 100 (step 284). The signal processing circuit 100 decides whether the input waveform data meets the criteria stored in the control circuit 110 (, or makes GO/NO-GO decision) (step 286). If it is decided not to meet the criteria, the input waveform data (that is, input waveform not meeting the criteria) is stored in the save memory 114. If it is decided to meet the criteria, decision is made of whether the set time interval, or one minute has passed or not (step 290). If one minute has passed, the time point (eight o'clock in the next morning) at which the input waveform data is started to collect is again set in the programmable timer 116 (step 292). Thereafter, a signal is supplied from the programmable timer 116 through the signal line 137 to the switch circuit 140, de-energizing all the circuits except the save memory 114 and programmable timer 116 (step 294).

Also, it is possible that the power supply to the oscilloscope is turned on by the programmable timer when a specified time comes and then turned off depending on the decision result.

The automatic data-collection function using the timer is not found in the conventional digital oscilloscope, and it is effective in recording the change of data with time. If this automatic data-collection function using timer is used in a battery-operated digital oscilloscope, automatic data collection can be made even in the place where any external power supply cannot be obtained. This function has the feature that the power supply can be turned off on the basis of the so-called GO/NO-GO decision result as well as it can be turned on and off by the timer. This considers the aspect in which the digital oscilloscope needs time management on an event of waveform collection.

The digital data saved by this function may be added with a time stamp by using a timer clock. In that case, this time stamp becomes effective in analyzing the collected data.

In this embodiment, a combination of one or more of the functions (1), (2) and (3) may be used.

According to this embodiment, the digital oscilloscope is able to greatly reduce its power consumption while it surely makes necessary operations. Also, it becomes effective in recording the change of input waveform data with time over a long time. Moreover, if this invention is applied to a battery-operated digital oscilloscope, the power saving feature is particularly effective for it since the battery consumption can be greatly reduced.

What is claimed is:

1. A method of controlling a supply of power to at least one circuit of a digital oscilloscope for indicating an input signal waveform on a display of said digital oscilloscope, comprising the steps of:

setting a timer to count a predetermined period;

detecting whether or not said digital oscilloscope is being operated starting said timer to count upon detection that said oscilloscope is not being operated; and stopping said supply of power to said at least one circuit to thereby stop a supply of power to said display when said timer has counted said predetermined period.

2. A method according to claim 1, further comprising the step of:

stopping power to at least one additional circuit of said oscilloscope when said timer has counted said predetermined period, said at least one additional circuit including an amplifying circuit for amplifying a signal input into the digital oscilloscope, a converter circuit for converting the signal amplified by said amplifying circuit into a digital signal, a memory circuit for storing the digital signal, a signal processor circuit for processing the digital signal stored in the memory circuit, and a display memory circuit for storing the digital signal processed by said signal processor circuit.

3. A method according to claim 1, wherein a power supply in said digital oscilloscope is a battery.

4. A method of controlling a supply of power to at least one circuit of a digital oscilloscope which operates in an operating mode which includes a run mode and a hold mode, said digital oscilloscope including a sampling circuit for sampling an input signal, a memory circuit for storing a sampled signal from said sampling circuit, a signal processor circuit for processing said signal stored in said memory circuit, a display circuit for displaying said signal processed by said signal processor circuit, and a power control circuit for controlling a supply of power to said sampling circuit, said memory circuit, said signal processor circuit, and said display circuit, comprising the steps of:

determining an operating mode selected between said run mode and said hold mode by a user; and controlling said power control circuit in accordance with said operating mode selected so that said power supplied to said oscilloscope differs between said run mode and said hold mode.

5. A method according to claim 4, wherein said controlling step includes a step for stopping supply of said power to at least said sampling circuit when said operating mode determined in said determining step is said hold mode.

6. A method according to claim 4, wherein said memory circuit includes a display memory for storing said signal processed by said processor means, and wherein said controlling step includes a step for stopping supply of said power to said display memory until said sampling circuit completely samples said input signal.

7. A method according to claim 4, wherein a power supply in said digital oscilloscope is a battery.

8. A method of controlling a supply of power to at least one circuit of a digital oscilloscope, including a sampling circuit for sampling an input signal, a memory circuit for storing a sampled signal from said sampling circuit, a signal processor circuit for processing said signal stored in said memory circuit, a display circuit for indicating said signal processed by said signal processor circuit, a timer, and a power control circuit responsive to said timer for controlling supply of power to said sampling circuit, said memory circuit, said signal processor circuit, and said display circuit, comprising the steps of:

supplying said power to said sampling circuit at a time when said timer is set;

sampling said input signal when said sampling circuit is actuated;

determining whether or not said sampled input signal meets predetermined criteria and outputting a signal representing a result of the determination; and controlling said power control circuit on a basis of said signal representing said result.

9. A method according to claim 8, further comprising the step of:

storing said sampled input signal in said memory circuit when said sampled input signal meets said predetermined criteria.

10. A method according to claim 8, wherein a power supply in said digital oscilloscope is a battery.

11. A digital oscilloscope for indicating an input signal waveform on a display, comprising:

a charging circuit;

a battery for being charged by said charging circuit;

a display portion for displaying the waveform of an input signal;

main circuits for processing said input signal and supplying said input signal to said display portion;

a dynamic memory coupled to said main circuits, for storing said input signal from said main circuits;

a converter for converting the output voltage of said battery into various different voltages which are supplied to said main circuits; and a regulating circuit for regulating the output voltage of said battery and supplying it to said dynamic memory.

12. A digital oscilloscope according to claim 11, wherein the standard voltage value of said battery is 9.6 V.

13. A digital oscilloscope according to claim 11, further comprising:

voltage detecting means for detecting that the output voltage of said battery has been reduced to a predetermined voltage; and means for cutting off the power from said battery to said main circuits when said voltage detecting means detects that the output voltage has been reduced to said predetermined voltage.

14. A digital oscilloscope according to claim 13, further comprising:

means for detecting whether said battery has been charged by said charging circuit, wherein said cutting-off means, when it is detected that said battery has not been charged by said charging circuit and that the output voltage of said battery has been reduced to said predetermined voltage, cuts off the power from said battery to said main circuits.

15. A digital oscilloscope according to claim 13, wherein said predetermined voltage is substantially equal to the final voltage of said battery.

16. A digital oscilloscope according to claim 13, wherein the voltage value of said battery is 9.6 V.

17. A method according to claim 1, further comprising a step of stopping power to all circuits of said digital oscilloscope when said timer has counted said predetermined period.

18. A method according to claim 4, wherein said controlling step includes the step of stopping power to all or part of the circuits which constitute said oscilloscope in accordance with an operating state of said operating mode.

19. A method according to claim 3, wherein said power supply supplies said supply of power to said at least one circuit.

20. A method according to claim 7, wherein said power supply supplies said supply of power to said at least one circuit.

21. A method according to claim 10, wherein said power supply supplies said supply of power to said at least one circuit.

* * * * *